Jan. 30, 1968   A. R. MOLZAN ET AL   3,365,759
MANUALLY-OPERATED QUICK DISCONNECT
Filed Jan. 14, 1966
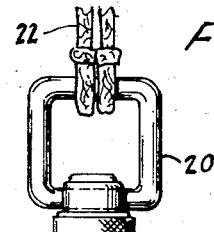
FIG. 1
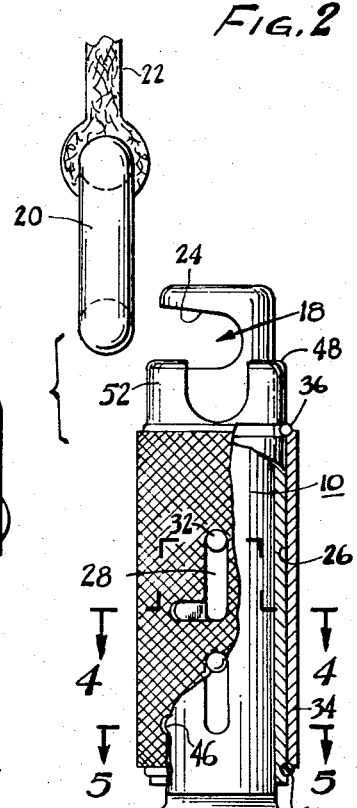
FIG. 2
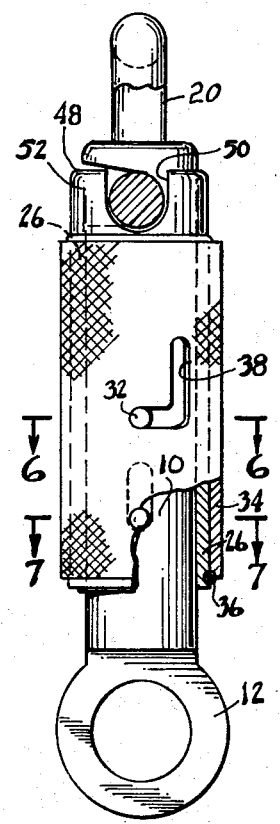
FIG. 3
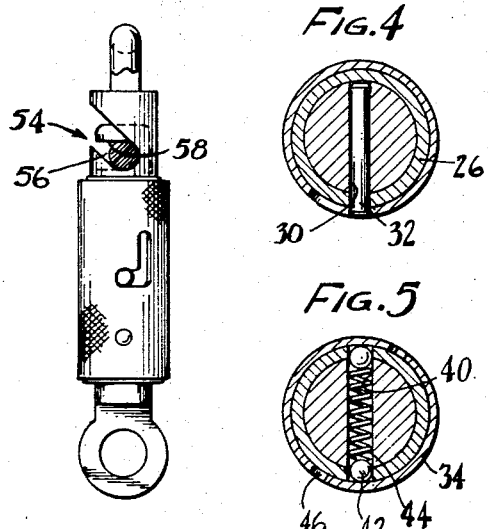
FIG. 4
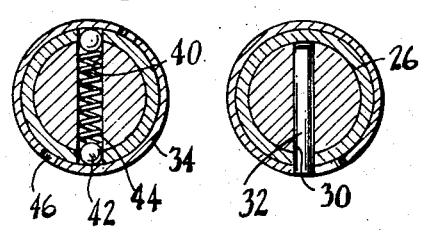
FIG. 5   FIG. 6
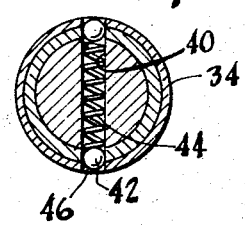
FIG. 7
FIG. 8
INVENTOR.
ALBERT R. MOLZAN
BY KLAAS HENDRICKS
Warren T. Jessup
Attorney

United States Patent Office 3,365,759
Patented Jan. 30, 1968

3,365,759
MANUALLY-OPERATED QUICK DISCONNECT
Albert R. Molzan, Alhambra, and Klaas Hendricks, Granada Hills, Calif., assignors to Rocket Jet Engineering Corporation, Glendale, Calif., a corporation of California
Filed Jan. 14, 1966, Ser. No. 520,744
8 Claims. (Cl. 24—230)

ABSTRACT OF THE DISCLOSURE

A quick disconnect device is disclosed in this application which has particular use, for example, in permitting a parachutist to disconnect certain of his parachute suspension lines, in order to control the glide of the parachute. However, the coupling device of the invention has general utility. The disconnect coupling device includes a stem and a pair of coaxial sleeves intercoupled to one another and to the stem. The sleeves are adjusted with respect to the stem by the parachutist, in order to open the disconnect and release the corresponding suspension line of the parachute.

---

This invention relates to quick disconnect devices in general and more particularly to a safety connector device for releasably connecting suspension lines of a parachute.

In the publication "Aerospace Safety" for July 1964, the concept of cutting four parachute suspension lines during descent is set forth as a means for decreasing rate of descent and oscillations. It is shown by actual tests developed by the Systems Engineering Group of AFSC Research and Technology Division that the parachute becomes steerable and will inherently glide in the direction the jumper faces at a rate of three to four knots in still air.

Instructions given are to use a knife to cut the lines. A hook blade riser knife is recommended when available. It has been found, in using this system, that the suspension lines will cut with exceptional ease whenever they are taut. Furthermore, although this system has proved to be exceptionally useful, there have been occasions when wrong lines have been cut in the confusion of the descent. Obviously, with the ease with which such cords may be cut, using a sharp knife under excitement circumstances in the vicinity of all the suspension cords is at best a risky procedure.

It is an object of this invention to provide a manually-operated quick disconnect device for connecting the desired suspension lines which must be released for the advantages desired.

Although the use of a disconnect device will eliminate the danger of a sharp knife in the vicinity of the taut cords, the use of any device which becomes difficult to manipulate is also dangerous.

It is a further object of this invention to provide a quick disconnect device which provides a solid metal inter-connection between each riser ring and the suspension line, thus avoiding composite structures capable of being defectively assembled.

It is a further object of this invention to provide a quick disconnect which will not hold at all, unless it holds safely, thus providing accurate inspection during packing.

With safety and reliability being of prime importance, the disconnect fitting is constructed with the further object of requiring two distinct operations for releasing the suspension line, thereby precluding any possibility of packing the parachute with the release fittings in an unsafe condition, and eliminating premature release during parachute deployment.

In accordance with these and other objects which will become apparent hereinafter, the best mode contemplated for the present invention is disclosed in the accompanying drawing wherein:

FIGURE 1 is a view of a parachute riser with five suspension lines directly connected to the riser D ring, and two lines connected through the quick disconnect of this invention;

FIGURE 2 is a side view of the disconnect device with a suspension line adapter ring in position for installation, or it may be considered to be in the position at the moment of release;

FIGURE 3 is the side elevation of FIGURE 2 with the adapter ring secured in place;

FIGURE 4 through 7 are taken along lines 4 through 7 of FIGURES 2 and 3; and

FIGURE 8 is a side elevational view similar to the view of FIGURE 3 of a modification of the invention.

Air crewmen formed to bail out, or jumping for military and fire fighting maneuvers, or other purposes, have much to think about in addition to their own safety, and place of landing. Although parachute guiding by disconnecting of suspension lines after the parachute has been completely opened is now a known process, the air crewman will be relieved of the need for finding a knife and risking his life by improper use of that knife, by the concepts of the invention illustrated in the drawing in its preferred embodiment.

Because a parachute construction is well known, only the top of a riser and the connecting ends of suspension lines are shown in the drawing.

The quick disconnect device of this invention is based upon the concept of providing a heat-treated steel lug of one integral piece, extending between the suspension line and the harness adapter, thus eliminating any composite structure which may have faulty assembly or inoperative parts. Hence a stem 10 of one-piece integral construction is provided with an eyelet 12 on one end which herein is referred to as the first end. This eyelet is provided for connection to a riser fitting. A steel ring riser fitting 14 is connected as an end loop in conventional manner to a harness riser 16, in FIGURE 1. Thus, the cross-bar of fitting 14 extends through eyelet 12, and the stem 10 extends in the direction of the suspension lines.

The second end of the stem, opposite from the eyelet 12, is partly traversed by a slot 18. A D ring 20 provides an adapter for the suspension line, which is indicated by reference character 22 in the drawing. Adapter ring 20 will slide into and out of the slot 18 without restriction.

By trapping the ring 20 in slot 18, a suspension force applied to the ring 20 will be transmitted through the longitudinal dimension of the stem 10 to the eyelet 12 and fitting 14.

However, the slot 18 has a top wall 24, which slopes in the direction away from first end eyelet 12, and, therefore, will act as a cam whenever longitudinal force is placed on the suspension line 22. The cam action will produce lateral force under tension to drive the D ring 20 out of the slot 18. This cam action becomes an automatic separation means whenever the ring 20 is permitted to be separated.

In order to control the separation, by blocking operation of the separation means, an inner sleeve 26 is closely mounted over the stem 10 and is longitudinally shiftable therealong. The movement of inner sleeve 26 with respect to the stem is controlled by means of an interlocking pin and slot arrangement.

The FIGURES 2 and 3, together with the section views, illustrate the provision of a longitudinal slot 28 in the sleeve 26 for guide purposes. A bore 30 in the stem 10 is a holding socket for a pin 32, used to guide by projecting into slot 28. Pin 32 projects, as seen in FIGURES 4 and 6, from the surface of stem 10 and extends through the slot 28. The width of slot 28 is a relatively close fit to the surface of pin 32, and, therefore, the sleeve 26 is confined to longitudinal movement on the stem 10, and is confined to move the distance dictated by the length of the slot 28.

An outer sleeve 34 is carried in close-fitted arrangement on the exterior surface of sleeve 26. The outer sleeve is held against longitudinal movement with respect to the inner sleeve by means of two lock rings 36. Thus, the two sleeves 26 and 34 are locked to move as a unit in the longitudinal direction, but the outer sleeve 34 is able to turn around the longitudinal axis of the coupled sleeves.

An L slot 38 in the wall of the sleeve 34 is provided to accept the end of the pin 32, as it extends beyond sleeve 26, and serves as a guide track also for the sleeve 34, providing for both a longitudinal and rotational freedom of movement.

Accordingly, the combination sleeves 26 and 34 have a joint longitudinal movement whenever the vertical leg of L slot 38 coincides with the longitudinal slot 28. When so aligned, the combination sleeves can move along the longitudinal dimension of the stem 10. Whenever the combination sleeves are retracted, as shown in FIGURE 2, the pin 32 prevents the rotation of the outer sleeve on the inner sleeve. However, with the combination sleeves advanced as shown in FIGURE 3, the cross or lateral portion of the L slot 38 is aligned with pin 32, and, therefore, the outer sleeve may rotate with respect to the inner sleeve.

When the outer sleeve is rotated as shown in FIGURE 3, the outer sleeve is then unable to move longitudinally because of the close confinement of the pin 32 in the lateral slot, and because the sleeves are coupled together by means of the rings 36, the inner sleeve will also be unable to move longitudinally.

In order to produce a "drag" of the combination sleeves and prevent unintentional movement of these sleeves, a bore 40 is provided through the stem 10 at a position below the location of the pin 32, and two detent balls 42 are urged apart and into contact with the inner surface of the outer sleeve 34 by means of strong spring 44. A hole 46 in the surface of the outer sleeve 34 provides a terminal lock position, wherein the ball 42 will cause a definite detent action to prevent rotation of the outer sleeve to align the vertical portion of slot 38 with pin 32. At other times, the detent ball provides a snug drag to prevent anything but intentional movement.

The inner sleeve has a forward end wall 48 which is formed with a deep notch 50. Thus, the front half of the divided sleeve end, indicated by the reference character 52, becomes a gate means for blocking operation of the separation which would take place if the ring 20 were merely placed in slot 18 without confinement. By advancing the combination sleeves 26 and 34, the notch 50, or more literally the gate 52, and the bottom of notch 18, jointly define a lateral through opening in which the ring 20 may reside and from which it cannot escape as long as the sleeves are in the forward position. In this forward position, the lateral portion of slot 38 in outer sleeve 34 is aligned with pin 32 and the rotation of the outer sleeve may take place to hold the sleeve combination locked in the forward position to prevent the separation of the ring 20.

With the ring 20 thus locked in the notch of the through lug stem 10, the air crewman is able to depend upon the use of all of the suspension lines to bring his parachute to a full and safe open condition. Thereafter, he may reach to the quick disconnect device and release the two desired suspension lines on each side without mistake. He cannot fumble in reaching, and merely pull down on the outer sleeve and cause release before he is ready, because a rotary motion is required before a vertical motion is possible. However, should he inadvertently twist the outer sleeve, or deliberately twist the outer sleeve and then decide not to release his line, the lines will not come apart by reason of the rotary movement. Another definite step is required. The longitudinal pulling of the sleeve combination must take place. It is this definite rotation of 60°, plus the definite longitudinal movement against resistance which gives assurance that the lines will be separated only when the jumper desires that they be separated.

In FIGURE 8, a modification of the construction is shown in that a slot 54, corresponding to the slot 18 of the stem 10, is shrouded by means of an inner sleeve having a slope notch 56. In this modification, the end of the inner sleeve projects beyond the end of the stem 10, in order to provide the top of the sloping notch 56.

The advantage of this modification is that rather than depending upon the cam action of sloping top wall 24, as shown in the notch 18, the ejectment is made into a positive ejectment by the cam action of the sloping notch 56. In the FIGURE 8, it will be seen that whether the adapter D ring operates against the top or bottom of the notch 56, the cam action will take place to force the ring out of the notch. In actual use the D ring is under suspension and will ride the top of the notch 56. Hence, the camming action will actually take place between the lower wall of the notch 54 and the top surface of the sloping notch 56. Hence, the top wall 58 of notch 56 may be perpendicular to the longitudinal axis of the stem 10 for elimination of any side cam thrust during use, and yet be assured full ejection action when desired.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. A quick disconnect coupling assembly including:
   an elongated stem having a first end and a second end and having connecting means at said first end;
   an inner sleeve mounted on said stem in coaxial relationship therewith and shiftable along said stem between an open position and a closed position with respect to said connecting means;
   an outer sleeve mounted on said inner sleeve in coaxial relationship therewith and rotatable about said inner sleeve;
   means intercoupling said inner and outer sleeves to prevent relative longitudinal motion thereof; and
   an interlocking pin and slot combination intercoupling said stem and said inner sleeve and outer sleeve to permit longitudinal movement of said inner sleeve on said stem only when said outer sleeve has a predetermined angular position with respect to said stem.

2. The assembly defined in claim 1 in which said interlocking pin and slot combination includes a pin protruding radially from said stem, said inner sleeve having a longitudinal slot therein for receiving said pin and said outer sleeve having an L-shaped slot therein for receiving said pin, so that said inner sleeve and outer sleeve may be jointly moved longitudinally on said stem only when said outer sleeve has a particular angular position with respect to said stem, and so that said outer sleeve may be turned relative to said inner sleeve only when said inner sleeve and outer sleeve have a particular longitudinal position with respect to said stem.

3. The assembly defined in claim 1 in which said first end of said stem has a slot formed therein to constitute said connecting means, said slot having a top wall sloping in a direction away from said second end of said stem.

4. The assembly defined in claim 1 and which includes detent means resiliently mounted on said stem and engaging said inner sleeve and outer sleeve to provide at least one angular lock position for said inner sleeve and outer sleeve on said stem.

5. The assembly defined in claim 1 in which said stem has a transverse slot formed therein at said first end thereof to constitute said connecting means, and in which said inner sleeve has a notch formed therein adjacent said transverse slot, the wall section of said sleeve adjacent one side of said notch acting as a gate for said transverse slot when said sleeve is in said closed position with respect to said connecting means.

6. The assembly defined in claim 1 in which said stem has a transverse slot formed therein at said first end thereof to constitute said connecting means, said inner sleeve has a slot formed therein extending in an angular direction towards said first end of said stem, a wall section of said sleeve below said last-named slot being dimensioned to act as a gate over said transverse slot in said stem when said sleeve is in said closed position, the aforesaid slots in the stem and in said inner sleeve registering in said closed position of said inner sleeve to define a ring retainer opening in said connecting means, and said slot in said inner sleeve acting as an ejection cam separation means upon movement of said inner sleeve along said stem from said closed position to said open position thereof.

7. A manually-operated quick disconnect for parachute suspension lines, comprising:
   a stem having a first end formed for permanent attachment to a supported harness;
   said stem having engagement surface means for holding a suspension line ring linked to the stem, said engagement surface means being a lateral slot in said stem;
   separation means for separating said suspension line ring from said engagement surface means;
   blocking means for preventing operation of said separation means, said blocking means having a first position of interfering with separation, and a second position releasing the separation means, said separation means and said blocking means being both incorporated as a sleeve over said stem, said sleeve having a slot extending in an angular direction towards said first end, a well section of said sleeve below said slot dimensioned to act as a gate over said lateral stem slot in an extended position of said sleeve;
   said slots of said stem and sleeve registering in said extended position to define a ring retainer through opening;
   said angular slot acting as an ejectment cam separation means upon retraction with respect to said lateral slot;
   track and follower means for providing a release tortuous path of said blocking means, said tortuous path providing a plurality of distinct directions of movement; and
   means resisting movement in said path.

8. A manually-operated quick disconnect for parachute suspension lines, comprising:
   a stem having a lateral slot therein;
   an inner sleeve closely fitted over the stem and having a longitudinal slot extending in an axial direction thereof, said inner sleeve having a gate wall, said inner sleeve having an advanced position wherein said gate wall bridges over a central portion of said slot to block said slot and define with said slot a lateral through opening;
   a pin carried by said stem and projecting through said longitudinal sleeve slot for confining said stem and inner sleeve to a relative advance and retract action;
   means for resisting free movement of said sleeve between said advance and retract positions; and
   manually operable rotary lock means for holding said inner sleeve in said advanced position, said rotary lock means being an outer sleeve fitted over said inner sleeve, means for confining said outer sleeve to a fixed position longitudinally on said inner sleeve and free to turn around said inner sleeve; and
   a L slot in said outer sleeve having a lateral leg and a vertical leg, said pin projecting into said L slot.

References Cited

UNITED STATES PATENTS

| | | | |
|---|---|---|---|
| 759,805 | 5/1904 | Broga | 24—239 X |
| 967,486 | 8/1910 | Avery | 24—239 X |
| 1,360,521 | 11/1920 | Gregory. | |
| 2,654,135 | 10/1953 | Grizzard. | |
| 2,825,112 | 3/1958 | Frieder. | |
| 2,826,798 | 3/1958 | Kahl | 24—238 |

FOREIGN PATENTS

| | | |
|---|---|---|
| 711,852 | 6/1965 | Canada. |
| 664,066 | 1/1952 | Great Britain. |

BERNARD A. GELAK, *Primary Examiner.*